United States Patent
Pilgram et al.

(10) Patent No.: US 7,606,270 B2
(45) Date of Patent: Oct. 20, 2009

(54) DEVICE AND METHOD FOR GENERATING CONTROL SIGNALS IN A RADIO STATION

(75) Inventors: Berndt Pilgram, Munich (DE); Dietmar Wenzel, Munich (DE)

(73) Assignee: Infineon Technologies AG (DE)

(*) Notice: Subject to any disclaimer, the term of this patent is extended or adjusted under 35 U.S.C. 154(b) by 763 days.

(21) Appl. No.: 11/154,232

(22) Filed: Jun. 16, 2005

(65) Prior Publication Data

US 2006/0013261 A1  Jan. 19, 2006

Related U.S. Application Data

(63) Continuation of application No. PCT/DE03/04047, filed on Dec. 9, 2003.

(30) Foreign Application Priority Data

Dec. 16, 2002  (DE) ............................... 102 58 764

(51) Int. Cl.
*H03J 3/06* (2006.01)
(52) U.S. Cl. .................. 370/503; 370/335; 370/338; 370/509
(58) Field of Classification Search .................. None
See application file for complete search history.

(56) References Cited

U.S. PATENT DOCUMENTS

| | | | |
|---|---|---|---|
| 5,872,821 A | 2/1999 | Schoffel | 375/371 |
| 6,144,650 A | 11/2000 | Watanabe et al. | 370/335 |
| 2001/0046240 A1* | 11/2001 | Longoni et al. | 370/503 |
| 2004/0013105 A1* | 1/2004 | Ahmavaara et al. | 370/349 |

FOREIGN PATENT DOCUMENTS

| | | |
|---|---|---|
| DE | 43 43 765 A1 | 6/1995 |
| DE | 102 13 262 A1 | 10/2003 |
| WO | WO 03/103315 A1 | 12/2003 |

* cited by examiner

*Primary Examiner*—Duc C Ho
(74) *Attorney, Agent, or Firm*—Dickstein, Shapiro, LLP.

(57) ABSTRACT

A radio station, in particular a mobile radio station, respectively has a unit for production of system information (2, 3), a memory unit (4, 5) and a control signal unit (6, 7) for production of control signals for the reception path and for the transmission path, for a reception path and for the transmission path. The two units (2, 3) for production of the system information are connected to a reference unit (1) by means of which reference system information is produced. The control signals for the reception path can be synchronized to the reference system information independently of the control signals for the transmission path, by programming a time discrepancy between the respective system information and the reference system information.

17 Claims, 1 Drawing Sheet

DEVICE AND METHOD FOR GENERATING CONTROL SIGNALS IN A RADIO STATION

CROSS-REFERENCE TO RELATED APPLICATION

This application is a continuation of copending International Application No. PCT/DE03/04047 filed on Dec. 9, 2003, which designates the United States, and claims priority to German Application No. 102 58 764.7 filed on Dec. 16, 2002, and is incorporated herein by reference in its entirety.

TECHNICAL FIELD

The invention relates to an apparatus for production of control signals for a transmission path and control signals for a reception path in a radio station, in particular in a mobile radio station, and to a method for production of such control signals.

BACKGROUND

Mobile stations which, for example, support the UMTS Standard (Universal Mobile Telecommunications System) have to synchronize their signal processing devices to the signals which they receive from base stations. Such synchronization is necessary in order to make it possible to correctly decode the data received with the received signal. Furthermore, a synchronized transmission signal must be sent by the mobile station to the base station in order that the base station can correctly decode the transmission signal received from the mobile station.

When a signal which is transmitted from the base station is received by the mobile radio station, the content of this received signal must be analyzed by the mobile station. In this case, it is necessary to identify characteristic signal contents, such as the start of a data transmission frame or the start of a time slot. These characteristic signal contents are monitored continuously in order, when appropriate, to detect a change in the position of these signal contents and then to make it possible to readjust the mobile station. This time readjustment of the reception path of the mobile station is carried out by means of a control unit in the mobile station. Furthermore, the mobile station must be synchronized to the times of occurrence of these characteristic signal contents in order to carry out actions on the received signal at defined times, in particular to transmit signal contents. The time matching of the mobile station to the signals from the base station, specifically on the one hand the readjustment of the reception path and on the other hand the synchronization of the transmission path of the mobile station to the base station, is carried out in known arrangements in mobile stations in such a way that only a single, common sequence control unit is provided for the transmission path and for the reception path. This relates not only to mobile stations which support the UMTS Standard but also to mobile stations which support the GSM/EDGE Standard. Particularly in the case of the transmission methods which are used in the UMTS Standard, only continuous signals are in general received and transmitted. Slaving of the mobile radio station to the signal received from a base station, and synchronization of the transmission path therefore result in particular difficulties in the UMTS Standard. Particularly in the case of mobile stations which support the UMTS Standard, the problem thus occurs that the control signals for the transmission path, which are generated in this single sequence control unit, must also be reprogrammed for synchronization of the reception path. This is necessary in order to maintain the time shift of 1024 chips between the reception path and the transmission path of the mobile station, as specified in the UMTS Standard. The synchronization of the reception path thus also continually requires reprogramming of the control signals for the transmission path. The synchronization process can thus be carried out only with a very large amount of effort.

SUMMARY

One object of the invention is to provide an apparatus for production of control signals for a reception path and a transmission path of a radio station, and a method for production of such control signals, by means of which the synchronization complexity is minimized.

An apparatus according to the invention for production of control signals for a transmission path and of control signals for a reception path in a radio station, in particular a mobile radio station, is designed to transmit/receive signals for a radio standard with a predetermined time pattern. One major idea of the invention is that the apparatus has means which are designed such that the control signals for the reception path can be synchronized to reference system information and, independently of this, the control signals for the transmission path can be synchronized to reference system information. In particular, the synchronization of the respective control signals to the reference system information takes place at independent times in each case. This makes it possible to synchronize the two paths of the radio station separately from one another. The reprogramming of the control signals, as is required in the prior art, of one of the two paths if the corresponding other path is synchronized is thus no longer required. The readjustment of the reception path which may be required can thus be carried out autonomously and in general without any influence on the synchronization of the transmission path. In the same way, the synchronization of the transmission path can be carried out separately, and essentially without any influence on the synchronization of the reception path.

The means advantageously have a reference unit which is associated with the circuit branch of the reception path and with the circuit branch of the transmission path, and by means of which the reference system information is produced for synchronization of the control signals for the reception path and for the synchronization of the control signals for the transmission path. This makes it possible to provide for any time discrepancy between the reception system information and the reference system information to be adjustable for synchronization of the control signals for the reception path, and/or for any time discrepancy between the transmission system information and the reference system information to be adjustable for synchronization of the control signals for the transmission path. This makes it possible to provide common reference system information and to use this as the basis for synchronization of the control signals for the reception path and of the control signals for the transmission path. The discrepancies are thus determined on the basis of this standard reference system information, which is used as basic information for synchronization of the reception path and for synchronization of the transmission path.

The means advantageously have a first unit for production of reception system information, and a second unit for production of transmission system information. The first unit and the second unit are preferably electrically connected to the reference unit, with the reference unit being connected upstream of the first and of the second unit. The respective system information for the respective paths is thus generated in separate units, independently of one another.

The means preferably also have a first control signal unit for production of control signals for the reception path, and have a second control signal unit for production of control signals for the transmission path. The first control signal unit for production of control signals for the reception path is advantageously connected to the first unit for production of reception system information and is connected downstream from this first unit. The second control signal unit for production of control signals for the transmission path is connected to the second unit for production of the transmission system information, and is connected downstream from this second unit. The means preferably have a first memory unit, which is electrically connected to the first unit, with information about the discrepancy between the reception system information and the reference system information being stored in the first memory unit. Furthermore, the means have a second memory unit which is electrically connected to the second unit, with information about the discrepancy between the transmission system information and the reference system information being stored in the second memory unit. This means that the synchronization of the transmission path is carried out in dedicated system units which are independent of those system units in which the synchronization of the reception path is carried out. The respective dedicated system units are thus arranged in the apparatus for each of the two paths, the reception path and the transmission path. The production of the control signals, of the system information and of the discrepancy between the respective system information and the reference system information is thus carried out separately for each of the two paths, and independently of the respective other path. Only the reference unit is associated with both circuit branches—a first circuit branch in which the system units for the reception path are connected, and a second circuit branch in which the system units for the transmission path are connected.

It is advantageous if the reference system information comprises the frame number of a reference data transmission frame and/or a number of a time slot which is associated with a reference data transmission frame, and/or the number of a unit into which a time slot of a reference data transmission frame is subdivided. It is also advantageous if the reception system information comprises the frame number of a reception data transmission frame and/or a number of a time slot which is associated with a reception data transmission frame, and/or the number of a unit into which a time slot in the reception data transmission frame is subdivided. It is also preferable if the transmission system information comprises the frame number of a transmission data transmission frame and/or a number of a time slot which is associated with a transmission data transmission frame, and/or the number of a unit into which a time slot in the transmission data transmission frame is subdivided. The radio standard which the radio station supports is preferably the UMTS Standard.

In a method according to the invention for production of control signals for a transmission path and of control signals for a reception path in a radio station, in particular a mobile radio station, the radio station is designed to transmit/receive signals for a radio standard with a predetermined time pattern. One major idea of the method according to the invention is that the control signals in the reception path are synchronized to reference system information and, independently of this, the control signals for the transmission path are synchronized to the reference system information. One major advantage of the method according to the invention is that readjustment and synchronization can be carried out separately from one another, in both paths of the radio station. There is thus no longer any need for the previously required reprogramming of the control signals of one of the two paths, if the corresponding other path is synchronized, as is essential with known methods.

DETAILED DESCRIPTION

Figure 1:
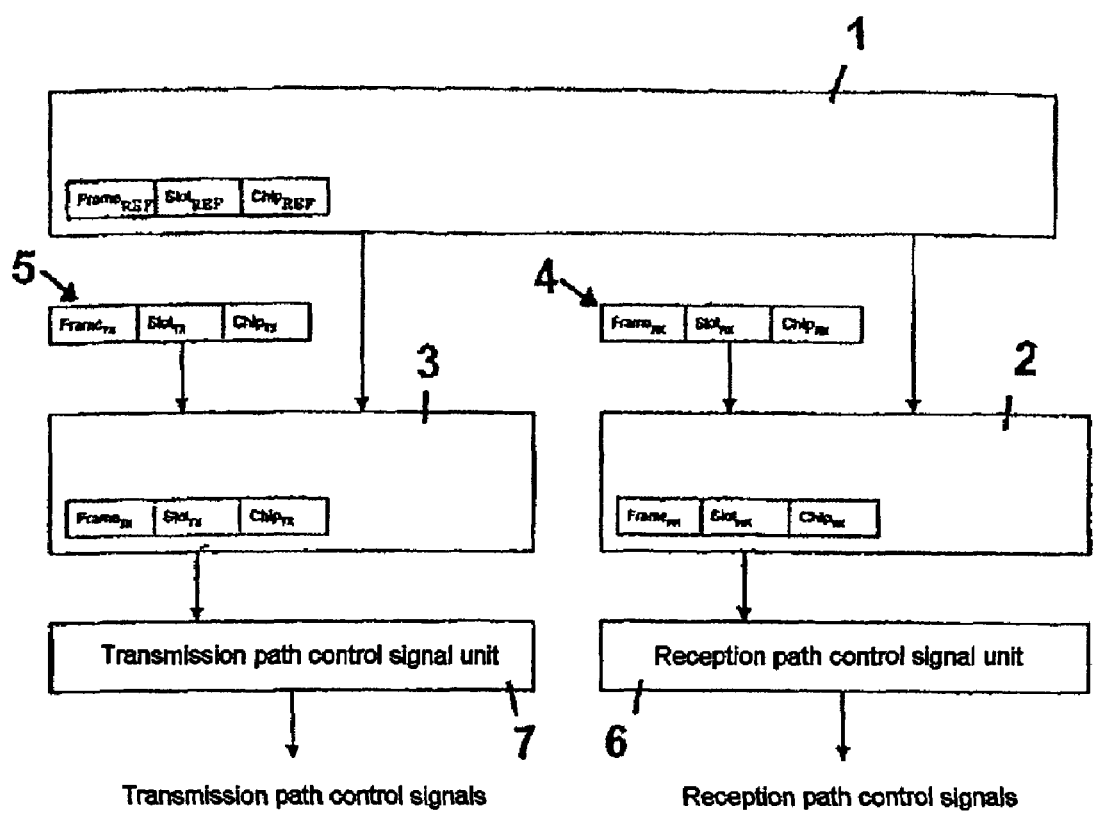
FIG. 1 is a block diagram of an embodiment according to the present invention.

The reference system information is used as the basis both for synchronization of the control signals for the reception path and for synchronization of the control signals for the transmission path. This makes it possible to use standard basic information for the synchronization of the paths.

A time discrepancy between the reception system information produced and the reference system information is advantageously adjusted for synchronization of the control signals for the reception path, and, independently of this, a time discrepancy between the transmission system information produced and the reference system information can be adjusted for synchronization of the control signals for the transmission path. The setting of the time discrepancy between the reception system information and the reference system information is advantageously programmed independently of the setting of the time discrepancy between the transmission system information and the reference system information.

A relative time discrepancy is preferably set between the reception system information and the transmission system information, and an absolute time discrepancy is in each case set between the reception system information and the reference system information, and between the transmission system information and the reference system information. The control signals for the reception path are advantageously produced in a first control signal unit at an accurate time with respect to reception system information, and the control signals for the transmission path are advantageously produced in a second control signal unit at an accurate time with respect to the transmission system information.

The invention will be explained in more detail in the following text with reference to a single schematic drawing. A mobile radio station, in particular a mobile radio station which supports the UMTS Standard, has an apparatus for production of control signals for a reception path and of control signals for a transmission path. As is illustrated in the block diagram in FIG. 1, the apparatus has a reference unit 1. Reference system information is stored in memory registers in the reference unit 1. The reference system information, which is referred to in the following text as the reference time, comprises a frame number of a reference data transmission frame $FRAME_{REF}$, a number of a time slot $SLOT_{REF}$ which is associated with a corresponding reference data transmission frame and into which a reference data transmission frame is subdivided, and a chip number $CHIP_{REF}$ into which a time slot of a reference data transmission frame is subdivided. The reference time is the time standard of a mobile radio station and starts to run at the time at which the mobile radio station is switched on.

The reference unit 1 is electrically connected to a first unit 2, with the first unit 2 being connected downstream from the reference unit 1, and with reception system information being produced by the first unit 2. The reception system information, which is referred to in the following text as the reception time, has a frame number of a received data transmission frame $FRAME_{RX}$, a number of a time slot $SLOT_{RX}$ which is associated with the corresponding received data transmission frame and into which a received data transmission frame is subdivided, and a chip number $CHIP_{RX}$ into which a time slot of the received data transmission frame is subdivided. The reception time starts to run when a received data transmission frame $FRAME_{RX}$ and/or a number of a time slot $SLOT_{RX}$ has been identified. The reception time in general starts to run with a time shift with respect to the reference time.

Furthermore, the reference unit 1 is electrically connected to a second unit 3, with the second unit 3 being connected downstream from the reference unit 1. The second unit 3 is used to produce transmission system information, independently of the reception system information in the first unit 2. The transmission system information, which is referred to in the following text as the transmission time, comprises a frame number of a transmission data transmission frame $FRAME_{TX}$, a number of a time slot $SLOT_{TX}$ which is associated with the transmission data transmission frame, and a number of a unit $CHIP_{TX}$ into which a time slot in the transmission data transmission frame is subdivided.

A first memory unit 4 is electrically connected to the first unit 2. Any time discrepancy between the reception time and the reference time is programmed and stored in the first memory unit 4. A frame number of a received data transmission frame $FRAME_{RX}$, a number of a time slot $SLOT_{RX}$ which is associated with the received data transmission frame, and a number of a unit $CHIP_{RX}$ into which one time slot in the received data transmission frame is subdivided are used in a corresponding manner as information for the defined and programmed discrepancy. A second memory unit 5 is electrically connected to the second unit 3. Any time discrepancy between the transmission time and the reference time is programmed and stored in the second memory unit 5. In this case, a frame number of a transmission data transmission frame $FRAME_{TX}$, a number of a time slot $SLOT_{TX}$ which is associated with the transmission data transmission frame, and a number of a unit $CHIP_{TX}$ into which one time slot in the transmission data transmission frame is subdivided are in this case used as information for the defined and programmed discrepancy.

The time discrepancies between the reception time and the transmission time, on the one hand and the reference time on the other hand are, in particular, indicated in numbers of a unit $CHIP_{RX}$ or $CHIP_{TX}$ into which a corresponding time slot in a corresponding data transmission frame is subdivided. Furthermore, the time discrepancies between the reception time and the reference time can be programmed independently of the time discrepancies between the transmission time and the reception time in the first memory unit 4 and in the second memory unit 5, respectively. The capability for flexible programming of the reception and transmission processes—provided by the independent units 2 and 3—makes it possible, for example, to set the time interval, as is required by the UMTS Standard, between the reception time and the transmission time (1024 chips with a tolerance of 1.5 chips) as an offset on the reference time. In addition, it is possible to achieve filter delay times in the transmission path by changing the time discrepancy between the transmission time and the reference time by means of simple reprogramming of a counter offset without, in the process, having to reprogram a possibly very extensive sequence of control signals for the reception path. The first unit 2 is electrically connected to a first control signal unit 6, which is connected downstream from this first unit 2. The first control signal unit 6 is used to produce control signals for the reception path. The control signals which are produced in the first control signal unit 6 for the reception path are thus shifted absolutely in time with respect to the reference system information, using the time discrepancy that is programmed in the memory unit 4. The control signals are thus generated at an accurate time with respect to specific reception times for the reception path.

Furthermore, the second unit 3 is electrically connected to a second control signal unit 7, which is connected downstream from this second unit 3. This second control signal unit 7 is used to produce control signals for the transmission path, independently of the control signals for the reception path. The control signals which are produced in the second control signal unit 7 for the transmission path are thus shifted absolutely in time with respect to the reference time, using the time discrepancy that is programmed in the second memory unit 5. The control signals in the transmission path are thus generated at an accurate time with respect to specific transmission times for the transmission path.

The reception time has a relative time shift with respect to the transmission time. The reception time and the transmission time each have an absolute time shift with respect to the reference time.

The apparatus according to the invention and the method according to the invention for production of control signals for a transmission path and of control signals for a reception path in a radio station allows the readjustment and the synchronization of the reception path and of the transmission path to be carried out independently of one another. At the same time, this ensures, however, that this readjustment and synchronization of the reception path and of the transmission path comply with and maintain the relative time shift, as required by the UMTS Standard, of 1024 chips between the reception path and the transmission path with a tolerance of 1.5 chips. In addition, this makes it possible to respectively shift both the reception time and the transmission time in their own right absolutely in time with respect to the reference time. The capability for independent programming of reception and transmission processes, provided by the two time-independent units 2 and 3 for production of the reception time and of the transmission time, respectively, allows considerably greater flexibility to be achieved.

We claim:

1. An apparatus for producing control signals for a transmission path and control signals for a reception path in a mobile radio station, with the radio station being designed to transmit/receive signals for a radio standard with a predetermined time pattern, the apparatus comprising:

a first control signal unit for producing the control signals for the reception path, and a second control signal unit for producing the control signals for the transmission path;

means for synchronizing the control signals for the reception path with reference system information, and means for independently synchronizing the control signals for the transmission path with the reference system information, wherein the means for synchronizing the control signals for the reception path comprises a first unit configured to produce reception system information, and the means for synchronizing the control signals for the transmission path comprises a second unit configured to produce transmission system information, and wherein the first control signal unit is coupled downstream of the first unit and the second control signal unit is coupled downstream of the second unit.

2. The apparatus according to claim 1, wherein the means for synchronizing further comprises a reference unit coupled to the first unit and second unit, and configured to produce the reference system information for synchronization of the control signals for the reception path and for the synchronization of the control signals for the transmission path.

3. The apparatus according to claim 2, wherein the reference unit is coupled upstream of the first unit and of the second unit.

4. The apparatus according to claim 1, wherein the means for synchronizing further comprises a first control signal unit for producing the control signals for the reception path, and a second control signal unit for producing the control signals for the transmission path.

5. The apparatus according to claim 4, wherein the first control signal unit is coupled downstream to the first unit, and the second control signal unit is coupled downstream to the second unit.

6. The apparatus according to claim 1, wherein the radio standard is the UMTS Standard.

7. An apparatus for producing control signals for a transmission path and control signals for a reception path in a mobile radio station, with the radio station being designed to transmit/receive signals for a radio standard with a predetermined time pattern, the apparatus comprising:
   a first control signal unit for producing the control signals for the reception path, and a second control signal unit for producing the control signals for the transmission path;
   means for synchronizing the control signals for the reception path with reference system information, and means for independently synchronizing the control signals for the transmission path with the reference system information,
   wherein the means for synchronizing the control signals for the reception path comprises a first unit configured to produce reception system information, and the means for synchronizing the control signals for the transmission path comprises a second unit configured to produce transmission system information, and
   wherein a time discrepancy between the reception system information and the reference system information can be adjusted for synchronization of the control signals for the reception path, and/or a time discrepancy between the transmission system information and the reference system information can be adjusted for synchronization of the control signals for the transmission path.

8. An apparatus for producing control signals for a transmission path and control signals for a reception path in a mobile radio station, with the radio station being designed to transmit/receive signals for a radio standard with a predetermined time pattern, the apparatus comprising:
   a first control signal unit for producing the control signals for the reception path, and a second control signal unit for producing the control signals for the transmission path;
   means for synchronizing the control signals for the reception path with reference system information, and means for independently synchronizing the control signals for the transmission path with the reference system information,
   wherein the means for synchronizing the control signals for the reception path comprises a first unit configured to produce reception system information, and the means for synchronizing the control signals for the transmission path comprises a second unit configured to produce transmission system information, and
   wherein the means for synchronizing the control signals for the reception path further comprises a first memory unit electrically coupled to the first unit, and configured to store information about the discrepancy between the reception system information and the reference system information; and
   wherein the means for synchronizing the control signals for the transmission path further comprises a second memory unit electrically coupled to the second unit, and configured to store information about the discrepancy between the transmission system information and the reference system information.

9. An apparatus for producing control signals for a transmission path and control signals for a reception path in a mobile radio station, with the radio station being designed to transmit/receive signals for a radio standard with a predetermined time pattern, the apparatus comprising:
   a first control signal unit for producing the control signals for the reception path, and a second control signal unit for producing the control signals for the transmission path;
   means for synchronizing the control signals for the reception path with reference system information, and means for independently synchronizing the control signals for the transmission path with the reference system information,
   wherein the means for synchronizing the control signals for the reception path comprises a first unit configured to produce reception system information, and the means for synchronizing the control signals for the transmission path comprises a second unit configured to produce transmission system information, and
   wherein
   the reference system information comprises at least one of the frame number of a reference data transmission frame, a number of a time slot which is associated with a reference data transmission frame, and the number of a unit into which a time slot of a reference data transmission frame is subdivided;
   the reception system information comprises at least one of the frame number of a reception data transmission frame, a number of a time slot which is associated with a reception data transmission frame, and the number of a unit into which a time slot in the reception data transmission frame is subdivided; and
   the transmission system information comprises at least one of the frame number of a transmission data transmission frame, a number of a time slot which is associated with a transmission data transmission frame, and the number of a unit into which a time slot in the transmission data transmission frame is subdivided.

10. A method for producing control signals for a transmission path and control signals for a reception path in a mobile radio station, with the radio station being designed to transmit/receive signals for a radio standard with a predetermined time pattern, the method comprising:
   producing and synchronizing the control signals in the reception path to reference system information;
   independently producing and synchronizing the control signals for the transmission path to the reference system information; and
   adjusting a time discrepancy between the reception system information and the reference system information to synchronize the control signals for the reception path, and, independently adjusting a time discrepancy between the transmission system information and the reference system information to synchronize the control signals for the transmission path, wherein reception system information is produced in the reception path and transmission system information is produced independently in the transmission path.

11. The method according to claim 10, wherein the radio standard is the UMTS Standard.

12. A method for producing control signals for a transmission path and control signals for a reception path in a mobile radio station, with the radio station being designed to transmit/receive signals for a radio standard with a predetermined time pattern, the method comprising:
   producing and synchronizing the control signals in the reception path to reference system information;
   independently producing and synchronizing the control signals for the transmission path to the reference system information; and
   setting a relative time discrepancy between the reception system information and the transmission system information, and setting an absolute time discrepancy in each case between the reception system information and the reference system information, and between the transmission system information and the reference system information,
   wherein reception system information is produced in the reception path and transmission system information is produced independently in the transmission path.

13. A method for producing control signals for a transmission path and control signals for a reception path in a mobile radio station, with the radio station being designed to transmit/receive signals for a radio standard with a predetermined time pattern, the method comprising:
   producing and synchronizing the control signals in the reception path to reference system information; and
   independently producing and synchronizing the control signals for the transmission path to the reference system information,
   wherein reception system information is produced in the reception path and transmission system information is produced independently in the transmission path, and
   wherein the control signals for the reception path are produced in a first control signal unit at an accurate time with respect to reception system information, and the control signals for the transmission path are produced in a second control signal unit at an accurate time with respect to the transmission system information.

14. An apparatus for producing control signals for a transmission path and control signals for a reception path in a mobile radio station, with the radio station being designed to transmit/receive signals for a radio standard with a predetermined time pattern, the apparatus comprising:
   a first unit configured to produce reception system information;
   a second unit configured to produce transmission system information;
   a first control signal unit coupled downstream of the first unit and configured to synchronize the control signals for the reception path with reference system information; and
   a second control signal unit coupled downstream of the second unit and configured to synchronize the control signals for the transmission path with the reference system information,
   wherein the control signals for the reception path and the control signals for the transmission path are synchronized independently from one another.

15. The apparatus according to claim 14, further comprising a reference unit coupled to the first unit and the second unit, and configured to produce the reference system information for synchronization of the control signals for the reception path and for the synchronization of the control signals for the transmission path.

16. The apparatus according to claim 15, wherein the reference unit is coupled upstream of the first unit and of the second unit.

17. An apparatus for producing control signals for a transmission path and control signals for a reception path in a mobile radio station, with the radio station being designed to transmit/receive signals for a radio standard with a predetermined time pattern, the apparatus comprising:
   a first unit configured to produce reception system information;
   a second unit configured to produce transmission system information;
   a first control signal unit coupled to the first unit and configured to synchronize the control signals for the reception path with reference system information; and
   a second control signal unit coupled to the second unit and configured to synchronize the control signals for the transmission path with the reference system information,
   wherein the control signals for the reception path and the control signals for the transmission path are synchronized independently from one another, and
   wherein a time discrepancy between the reception system information and the reference system information can be adjusted to synchronize the control signals in the reception path, and/or a time discrepancy between the transmission system information and the reference system information can be adjusted to synchronize the control signals for the transmission path.

* * * * *

UNITED STATES PATENT AND TRADEMARK OFFICE
CERTIFICATE OF CORRECTION

| | | |
|---|---|---|
| PATENT NO. | : 7,606,270 B2 | Page 1 of 1 |
| APPLICATION NO. | : 11/154232 | |
| DATED | : October 20, 2009 | |
| INVENTOR(S) | : Pilgram et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1161 days.

Signed and Sealed this

Fifth Day of October, 2010

David J. Kappos
*Director of the United States Patent and Trademark Office*